United States Patent [19]
Czernichowski et al.

[11] Patent Number: 6,007,742
[45] Date of Patent: *Dec. 28, 1999

[54] ELECTRICALLY ASSISTED PARTIAL OXIDATION OF LIGHT HYDROCARBONS BY OXYGEN

[75] Inventors: Piotr Czernichowski; Albin Czernichowski, both of Orleans, France

[73] Assignee: Laxarco Holding Limited, Houston, Tex.

[*] Notice: This patent is subject to a terminal disclaimer.

[21] Appl. No.: 09/144,318

[22] Filed: Aug. 31, 1998

[51] Int. Cl.[6] ............................. C01B 3/00; C01B 31/00; H05F 3/00
[52] U.S. Cl. .................... 252/372; 252/373; 204/157.15; 204/157.47; 204/157.52; 204/164
[58] Field of Search ..................... 252/372, 373; 204/157.15, 157.47, 157.52, 177, 178, 179, 164

[56] References Cited

U.S. PATENT DOCUMENTS 4,144,444  3/1979  Dementiev et al. ................... 219/383

FOREIGN PATENT DOCUMENTS

| | | | |
|---|---|---|---|
| 1059065 | 7/1979 | Canada | B01J 1/14 |
| 2 724 806 A1 | 3/1996 | France | H05H 1/48 |
| WO 94/26656 | 11/1994 | WIPO | C01B 3/38 |

OTHER PUBLICATIONS

Meguernes et al., "Oxidation of CH4 by H2O in a Gliding Elevtric Arc", Groupe Recherches Energetique Milieux Ionises, UFR Sciences, pp. 495–500, 1995.

Lesueur, et al., "Electrically Assisted Partial Oxidation of Methane," 2428 International Journal of Hydrogen Energy, Feb. 19, 1994, Head. Hill Hall, Oxford, GB, pp. 139–144.

DialogWeb Derwent database search results for English–language Abstract for French patent 2274806A1 dated Mar. 22, 1996, downloaded and printed from the web on Jan. 25, 1999 (2 pages).

International Search Report for PCT/US 98/18027 mailed Jan. 4, 1999.

*Primary Examiner*—Gary P. Straub
*Assistant Examiner*—Eileen E. Nave
*Attorney, Agent, or Firm*—Conley, Rose & Tayon, P.C.; Mark L. Berrier

[57] ABSTRACT

A process and device for electrically assisted partial oxidation of light hydrocarbons by oxygen. The purpose of the process and device is to produce gases rich in CO and $H_2$ that may also have high contents of $C_2H_4$ and $C_2H_2$, without any formation of soot or coke by assisting with gliding electric discharge plasma the partial oxidation of hydrocarbons, accompanied by their steam reforming and/or reforming with $CO_2$. This mixture of products is achieved in a plasma reactor with gliding electric discharges that glow in the compartment brought to a temperature lower than 1200° C. and at a pressure of less than 6 bars. The discharges act directly in an exothermic reactive medium consisting of hydrocarbons mixed with gaseous oxygen of any origin, and possibly with $H_2O$ and/or $CO_2$. The flow of products activated by the plasma and exiting the zone comes into contact with a metal or ceramic material placed in the compartment that is brought to a temperature not exceeding 1100° C. This material becomes active in the presence of the flow of products and, as such, it contributes to the enhancement of the conversion of the products exiting the plasma compartment into the final product.

26 Claims, 2 Drawing Sheets

ELECTRICALLY ASSISTED PARTIAL OXIDATION OF LIGHT HYDROCARBONS BY OXYGEN

BACKGROUND OF THE INVENTION

1. Field of the Invention

The present invention relates to a process for the conversion of light hydrocarbons (HCs) through the use of plasma and, in particular, through gliding electric discharges in the presence of oxygen $O_2$ and possibly of water vapor $H_2O$ added to these HCs.

2. Description of the Relevant Art

The production of syngas from light saturated HCs is a relatively well known and very important stage, especially for a chemical valorization of the natural gasses (NGs). A chemical valorization of immense resources of NG would be much more interesting than its total finite combustion towards the direct recovery of energy in the furnaces, boilers or turbines. There are also situations where the NGs with high HC content are released to the earth's atmosphere, even without any recovery of energy; this may be illustrated by oil field flares that burn a hydrocarbon contained gas known as "associated gas", or by different emanations of biogas (mixture mainly of methane and carbon dioxide of near equal content) originating from an anaerobic fermentation of organic waste. Any emission of needlessly burned and, especially, unburned HC contributes heavily to the atmospheric pollution.

The most used current process to produce syngas, the catalytic steam reforming process (or also "steam reforming"), encounters major difficulties. In principle, it requires only a high temperature (thermodynamic reason) and a high pressure (kinetic reason). However, in practice, in spite of the know-how for the production of syngas according to this process, the joint control of the compositions, pressures and temperatures is delicate, even impossible, without resorting to the use of catalysts. Therefore, in order to perform the steam reforming of a NG, a catalytic device is generally selected: presence of solid material under highly dispersed and active form (with a specific surface of at least one hundred $m^2$ per gram) for temperatures that may be reached without great difficulty. The classic steam reforming technology thus used requires furnaces containing several hundreds of brittle metal pipes (filled with a catalyst and of which the length may reach several tens of meters), heated externally with NG.

Thus, the large quantities of carbon dioxide originating from the combustion are discharged into the atmosphere by these furnaces, which have a very poor thermal performance. This technology is also linked to very high pressure losses. The temperature that may be withstood by the pipes also prevents the reduction of the $CO_2$ content in the actual syngas (hindrance product resulting from a side reaction at a temperature too low). Other difficulties are related to the contamination of the catalysts by sulfur and/or nitrogen, the aging of the catalysts, the necessary excess of steam and/or the formation of soots (which block the entire tubular system at the macroscopic scale and, in particular, the microscopic pores of the catalyst). These difficulties are observed mainly in the steam reforming of HCs heavier than methane; they are more brittle and, thus, more coking.

A bibliographic research covering the last three decades gave very few published results regarding the partially oxidizing conversion of saturated HCs assisted by oxygen and plasma. This might be due to difficulties linked to the presence of free oxygen attacking the conventional tungsten or graphite electrodes of traditional plasma devices.

We know of only one attempt to use plasma in this environment (outside of our own efforts). P. CAPEZZUTO et al. ["The oxidation of methane with carbon dioxide, water vapor, and oxygen in radio-frequency discharges at moderate pressures", $3^{rd}$ Int. Symp. on Plasma Chemistry, Limoges, 1976, contribution G.5.11, 7 pp.] studied a partial oxidation of methane mixed separately with $CO_2$, either with $O_2$ or H2O, with oxidant/$CH_4$ molar ratio=1. The 35 MHz RF plasma reactor needed an additional flux of argon and could only work at a very low pressure of approximately 2.7 kPa. For a total incoming gas flow of 3 to 36 l(n)/min, the energy density was very high and ranged from 1 to 12 $kWh/m^3$. No industrialization was possible due to the high electric power and noble gas consumption (in addition to the complicated electric power supply and the need to work under vacuum). Due to the mechanical requirements of implantation, the poor energy performance and the insufficient unit powers of RF plasma sources, this method is poorly adapted, from an economic point of view, for the transformation of significant gas flows.

In Orleans, since 1986, we also worked on the conversion of NGs in thermal plasma reactors. These classic simple or transferred arc plasma torches make it possible to obtain small volume plasmas at very high temperatures (T>10 kK). Although these devices are potential sources of active species, they are however poorly adapted to the chemistry applications that require much lower temperatures (in order not to destroy the hydrocarbon molecules to the extent that they become soot) and especially larger volumes, filled with plasma, in order to act closely on the entire fluid to b e processed. The plasma torch technology that is, for example, well established in the solid projection field, was found to be both costly and very difficult to implement for chemical processes.

However, we achieved improvements in the field of thermal plasmas, in the case of a transformation of methane in a specifically controlled electric arc, see P. JORGENSEN et al., "Process of Production of Reactive Gases Rich in Hydrogen and Carbon Monoxide in an Electric Post-Arc", BF 2 593 493 (1986). The structure of the device, as implemented then, did unfortunately not make it possible to use water vapor as reactant or to work without consuming the argon necessary as gas forming the plasma of a first pilot arc. We then used almost the same high current (20–150 A) arc to study the oxidation of ethane, see K. MEGUERNES et al., "Oxidation of ethane $C_2H_6$ by $CO_2$ or $O_2$ in an electric arc", J. High Temp. Chem. Process, vol. 1(3), p. 71–76 (1992) without much improvement in the consumption of electric power and argon.

SUMMARY OF THE INVENTION

The invention comprises a process and device for electrically assisted partial oxidation of light hydrocarbons by oxygen. The purpose of the process and device is to produce gases rich in CO and $H_2$ that may also have high contents of $C_2H_4$ and $C_2H_2$, without any formation of soot or coke by assisting with gliding electric discharge plasma the partial oxidation of hydrocarbons, accompanied by their steam reforming and/or reforming with $CO_2$,. This mixture of products is achieved in a plasma reactor with gliding electric discharges that glow in the compartment brought to a temperature lower than 1200° C. and at a pressure of less than 6 bars. The discharges act directly in an exothermic reactive medium consisting of hydrocarbons mixed with gaseous oxygen of any origin, and possibly with $H_2O$ and/or $CO_2$. The flow of products activated by the plasma and exiting the zone comes into contact with a metal or ceramic material placed in the compartment that is brought to a temperature not exceeding 1100° C. This material becomes active in the presence of the flow of products and, as such, it contributes to the enhancement of the conversion of the products exiting the plasma compartment into the final product.

BRIEF DESCRIPTION OF THE DRAWINGS

Other objects and advantages of the invention will become apparent upon reading the following detailed description and upon reference to the accompanying drawings in which.

Figure 1:
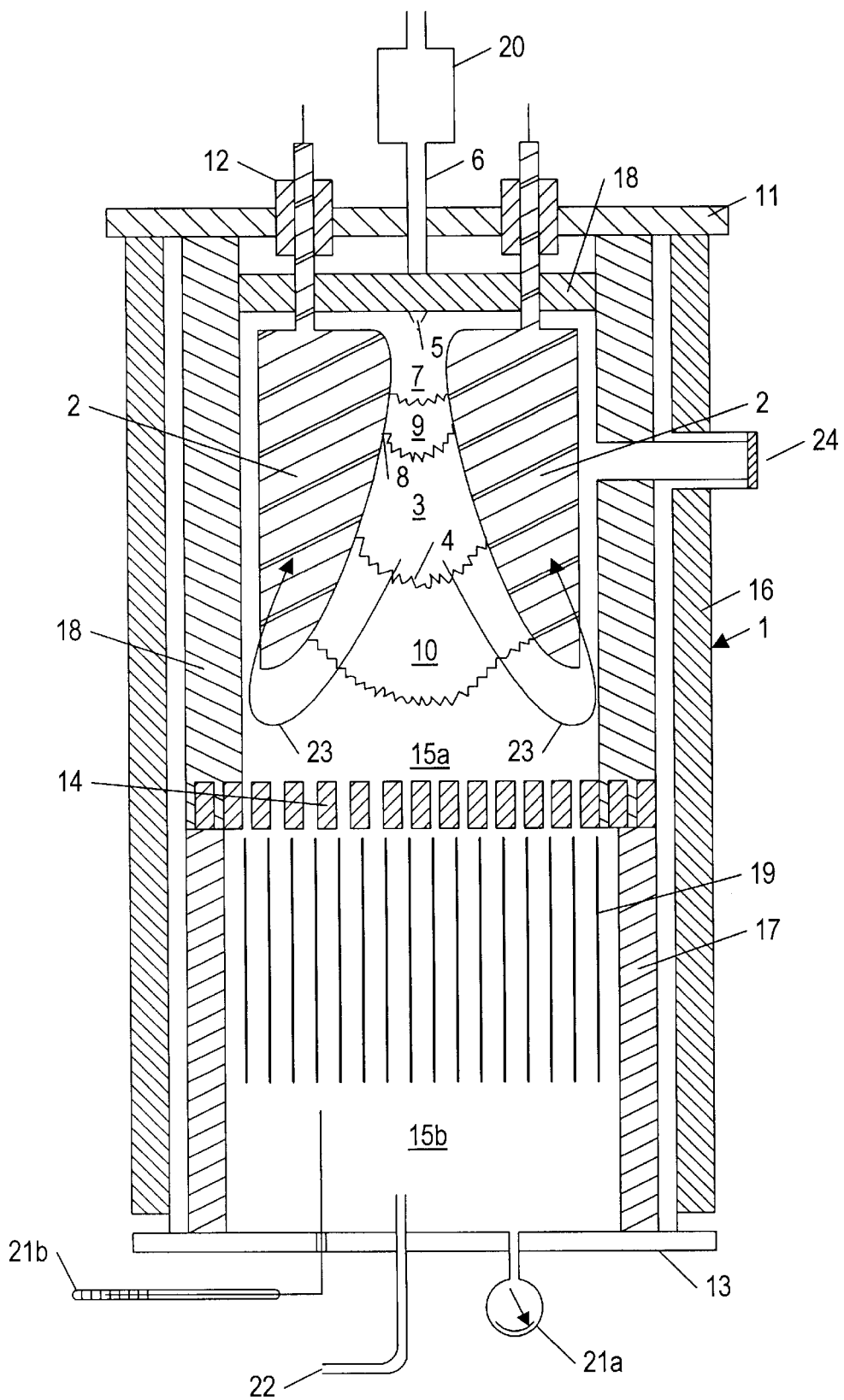
FIG. 1 is a cross sectional view of a gliding discharge reactor according to one embodiment of the invention.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

The process is illustrated by the conversion of some typical mixtures of light HCs (containing mainly methane $CH_4$ and ethane $C_2H_6$, propane $C_3H_8$ and the two butanes $C_4H_{10}$) in a gliding discharge reactor fitted with a post-plasma compartment filled with solid material. These HC mixtures may contain any quantities of nitrogen $N_2$ and/or carbon dioxide $CO_2$. Therefore, the invention may be applied to any pure HC such as $CH_4$, $C_2H_6$, $C_3H_8$ or $C_4H_{10}$, and to their natural or industrial mixtures such as NG, "associated" gas of petroleum wells, flare gas, pyrolytic gas, "mine gas", biogas, etc.

In the presence of oxygen and possibly water vapor (both added to the hydrocarbon feedstock), it is thus possible to convert completely or partially all of these NGs into "synthesis gas", also referred to as "syngas", which is a mixture composed mainly of hydrogen $H_2$ and carbon monoxide CO. The conversion may also be performed in order to produce a syngas containing other valuable products such as ethylene ($C_2H_4$) and acetylene ($C_2H_2$). The process is based mainly on the exothermal reactions of the partial oxidation of methane and/or its paraffinic equivalents (saturated).

$$CH_4 + \tfrac{1}{2}O_2 = CO + 2H_2, \tag{1}$$

$$C_nH_{2n+2} + n/2 O_2 = nCO + (n+1)H_2, \tag{2}$$

accompanied by endothermic steam reforming such as:

$$CH_4 + H_2O = CO + 3H_2, \tag{3}$$

$$C_nH_{2n+2} + nH_2O = nCO + (2n+1)H_2, \tag{4}$$

and/or endothermic cracking such as:

$$2CH_4 = C_2H_4 + 2H_2, \tag{5}$$

$$2CH_4 = C_2H_2 + 3H_2, \tag{6}$$

$$C_2H_6 = C_2H_4 + H_2, \tag{7}$$

$$C_2H_6 = C_2H_2 + 2H_2, \tag{8}$$

$$2C_3H_8 = 3C_2H_4 + 2H_2, \tag{9}$$

as well as the simple and reverse "water shift" (quasi-athermic reactions):

$$CO + H_2O \leftrightarrow CO_2 + H_2, \tag{10}$$

Furthermore, highly exothermic reactions are observed from a total oxidation, such as:

$$CH_4 + 2O_2 = CO_2 + 2H_2O, \tag{11}$$

$$C_nH_{2n+2} + (3n+1)/2 O_2 = nCO_2 + (n+1)H_2O, \tag{12}$$

from a deep pyrolysis (endothermic) of HCs going to the elementary carbon such as:

$$CH_4 = C + 2H_2, \tag{13}$$

$$C_nH_{2n+2} = nC + (n+1)H_2, \tag{14}$$

and from endothermic reforming with the carbon dioxide produced during the reactions:

$$CH_4 + CO_2 = 2CO + H_2, \tag{15}$$

$$C_nH_{2n+2} + nCO_2 = 2nCO + (n+1)H_2, \tag{16}$$

All these reactions are carried out in a medium highly activated by the presence of a particular plasma produced by gliding electric discharges. The activation of the medium is reflected by the presence of rather unusual species (compared to conventional conditions of NG conversions) originating from the material where these discharges take place. Thus, it is possible to detect electrons, as well as atoms, ions, and/or molecular radicals such as H, OH, O, $O_2$, $H^+$, $O^+$, $O_2+$, $O_2^-$, $HO_2$, $CH_3$, $CH_2$, CH, $C_2$ and many others. Most of these species may exist in their "long-living" vibrational or electronic excited state. They are also known as being extremely chemically active.

The conversion of HCs according to the endothermal reactions (3) to (9) and (13) to (16) would require the addition of preferably "clean" energy, detached from any external combustion that is not cost-effective and is highly polluting. The best way to promote these reactions would be to perform electric arcs and/or discharges directly in the medium to be converted, by imposing a permanent distribution of energy in the greatest volume to be processed. The transfer of electric energy to the gas medium would be achieved through the direct transfer of the energy to the molecules. That would result in phenomena of excitation, ionization, dissociation and also in the Joule effect, by considering the ionized medium as a gaseous conductor. The gas medium, which was rendered conductive after the ionization (itself due to a dielectric breakdown, thus a preionization) between electrodes brought to different potentials, would be considered as an electrical resistance and, at the same time, as some kind of electrolyte in a gaseous phase: the plasma.

The plasma is defined as the $4^{th}$ state of matter and, therefore, cannot under any circumstances be used as a similarity criterion for different previously known processes. There are many different plasmas and several ways to achieve each of said plasmas. By definition, the plasma is a gas medium where particles are partially ionized. In most plasmas, the macroscopic physical quantity—the temperature—is the same for all the components: that represents the thermodynamic equilibrium. Such conditions are easy to obtain: all that is required is to provide a great amount of energy, as in the case of plasma torches ("plasmatrons") where the plasma is produced by a very high current electric arc. There are also other devices capable of generating this state, such as induction or radiofrequency (RF) torches where the gas medium enters into resonance with a very high frequency electromagnetic field. Such plasmas are known as thermal plasmas. It is lo obvious that a thermal plasma will modify the chemistry of a gas medium by destroying practically all molecules, especially those that are brittle like HCs. The fragments remaining at the end of the process, after a sudden temperature drop by quenching with no recovery of energy, originate from partial recombination phenomena that produce simple molecules. Such chemistry offers very poor possibilities, requires a lot of energy and is faced with problems linked to high temperature, in particular, the resistance of materials.

Chemists prefer plasmas that do not meet the conditions of total thermodynamic equilibrium. It suffices, for example, to act on the free electrons. It is also possible to act on the rotation or vibration properties of some molecules. In energy terms, this consists in breaking the equilibrium of energy exchanges between the plasma and its surrounding medium. This state is referred to as "thermodynamic non equilibrium".

Such plasmas are sometimes referred to as "low temperature" plasmas, although the notion of temperature can no longer be used. There are several methods to generate such plasmas: microwaves, electron beams, flame fronts etc. But generators of such plasmas that may be converted to the industrial scale are rare and serve only for a very specific purpose. That is why such plasmas are seldom used in chemistry.

Also, when a plasma is established or terminated, the equilibrium is broken. These transitional stages actually constitute non equilibrium plasmas and last only a few ms. One type of plasma exploits this phenomenon, the plasma of gliding electric discharges and arcs known as "GlidArc". Outside of the numerous geometrical possibilities of such plasma generator and, in a very general manner, the parameters upon which the chemist may act are: the pressure, temperature, gas velocity, current intensity, voltage and electric frequency. Such number of parameters exceeds the traditional reasoning capacities of the experts. For each application, a real know-how and inventive activity is required in order to achieve the result, of which the objectives are both cost-effectiveness and environmental compliance. The GlidArc thus enables the chemist to consider the distribution of an energy supply directly into the gas mixture and, for example, to resort to catalysts. The chemist may also distribute the energy directly either as thermal energy or as chemical energy. He may also act upon the flux that is still charged with active species exiting the zone of arcs or gliding discharges, in order to cause a reaction between these species and the feedstock to be converted or reconverted in a post-plasma zone.

We then discovered that, with a few modifications, the GlidArc is very well adapted for a pure water vapor supply as the only plasma forming medium. Water vapor superheating tests with these devices were performed at the laboratory scale and at the atmospheric pressure. The improved GlidArc was fed very humid water vapor at 105° C. No deterioration of the plasma generated fed with water vapor was observed after several long experiments. The water vapor thus superheated at the atmospheric pressure and chemically activated by the presence of H, O, OH and other metastable species, can be interesting for drying or for chemical transformations, see P. CZERNICHOWSKI and A. CZERNICHOWSKI, "Gliding electric arcs to overheat water vapor", $9^{th}$ University-Industry Colloquium "The electrical techniques and the quality of drying", Bordeaux-Talence, 1994, p. B1-1–B1-7.

It is at this stage that we thought that a classic steam reforming of pure methane could be improved in the presence of gliding electric discharges or arcs, which bring to the reactive medium both an easily controllable enthalpy and highly reactive species. These particular discharges and arcs may thus play the role of a catalyst in a homogeneous phase, see A. CZERNICHOWSKI et al., "Process and device using plasma to enhance non catalytic steam reforming of hydrocarbon and halogeno-organic compounds", BF 2 724 806 (1994).

The previously mentioned endothermic reaction (3) of steam reforming of lo methane requires, in order to be completed under standard conditions (298 K, 1 atm), an energy equivalent to 206 kJ per mole $CH_4$ transformed, or otherwise to 0.64 kWh per 1 $m^3(n)$ of $CO+3H_2$ mixture produced. Since the reaction is just initiated under standard conditions (the rate of transformation of $CH_4$ being only 0.005%), according to the Thermodynamics, the reactants must be heated at higher temperatures, which not only requires providing the enthalpy of the reaction, but also leads to heating the entire mixture. Our calculations indicated that a minimum cost, 0.933 kWh per 1 $m^3(n)$, corresponded to the temperature of 950 K where an initial transformation of 75% $CH_4$ is achieved. However, at this stage, the $H_2/CO$ molar ratio is too high (4.98) for some applications of such syngas. Such gas composition was totally unsuited for the Fischer-Tropsch technology (FT, synthesis of synthetic hydrocarbon fuels, "syncrude") or a similar technology for the production of methanol. The two processes require a syngas with a $H_2/CO$ ratio of approximately 2, plus a low concentration of residual methane. In order to increase the methane transformation rate to 97%, the entire reactive mixture should be heated to 1200 K, at the theoretical price of 0.986 kWh per 1 $m^3(n)$ of syngas, but the excess hydrogen would remain at a level of $H_2/CO=3.04$.

The decomposition of pure $CH_4$ in the presence of water vapor superheated in a GlidArc reactor actually produced large quantities (in terms of volume percentages) of $H_2$ (up to 66% in the dry product) and CO (up to 15%), while the volume percentages of $C_2H_2$ (max. 1.1%) and $C_2H_4$ (max. ~0.34%) were low. In all cases, we had $H_2/CO$ ratios in excess of 4 and even up to 5.8. Furthermore, the energy price to be paid in order to produce 1 $m^3(n)$ of such syngas was rather high and another problem appeared: a too high methane content remained in the product.

We then had another idea: to apply simultaneously $H_2O$ and $O_2$ mixed so as to perform at the same time, during one single operation in the gliding discharge reactor, a conversion of some light HCs by an endothermic steam reforming (reactions 3 and 4) and a partial oxidation with oxygen (reactions 1 and 2), which would produce a significant portion of the energy required for the endothermic steam reforming. Part of the oxygen would be consumed by the reactions (11) and (12) that appear to be side reactions (but strongly exothermic), however the $CO_2$ produced by these reactions could contribute to lowering the $H_2/CO$ ratio via the reverse reaction (10).

A similar approach to said reforming of NGs is known in the industry as "Auto-Thermal Reforming" ("ATR" or "auto-thermal" process), but this mixed reforming is necessarily coupled with a catalytic post-treatment of the gas exiting the partial combustion zone, see T. S. CHRIS- TENSEN and I. I. PRIMDAHL, "Improve syngas production using autothermal reforming", Hydrocarbon Processing, vol. 73(3), p. 39–46 (1994). A highly sophisticated thermal burner is at the core of the ATR process, as the entire security related to the operations involving the mixture of oxygen and HCs at the uncontrolled explosive limit depends on its proper operation.

Our reactive system for the mixed reforming of HCs with oxygen and water vapor in the presence of gliding electric discharges contains also a reverse shift of part of the hydrogen to CO (reaction 10). This makes it possible to obtain a syngas having a $H_2/CO$ molar ratio good for one subsequent use of the syngas, for example via a FT process. This objective was achieved and, furthermore, we were surprised by the appearance of other products from the conversion of the feedstock according to reactions (5) to (9): $C_2H_4$ and $C_2H_2$ at relatively high contents. These unsaturated products may thus add some value to this light HC conversion process, assisted by gliding electric discharges.

Another new idea is to divide a gliding discharge reactor into two compartments. By adding a more or less virtual separation, for example in the form of a perforated diaphragm, we thus create a gliding electric discharge compartment with a reinforcement of the circulation of reactants. We isolate this compartment thermally so that the temperature of its walls and the electrodes themselves may be raised as much as possible. To this, we add another "post-plasma" compartment where the reactions generated in the plasma zone can be completed and where the products generated in the plasma zone can eventually be modified. The two compartments (or zones) of the reactor communicate through a relatively large hole, or preferably a perforated plate, or even a porous material, enabling the reactants and the active species produced in the plasma zone to penetrate in the post-plasma zone.

Finally, another new idea is to partially fill the post-plasma zone with a solid material playing the role of a contact on which we promote reactive exchanges between the species generated in the plasma zone. The solid material does not need to be known as a catalyst. It may become so by contact with the species originating from the plasma zone.

PLASMA DEVICE

Several types of gliding discharge reactors can be used. The one illustrated in FIG. 1s a laboratory scale device used to illustrate the invention. Naturally, this is only a non-restrictive example for the elaboration of a future industrial scale reactor. The gliding discharge reactor /1/ uses six electrodes /2/ in profiled stainless steel sheet 2 mm hick (only two of the six electrodes arranged symmetrically around the flow axis of the fluid to be processed are shown on FIG. 1). Each of the electrodes has a length of 8 cm and a width of 25 mm. The electrodes delimit a nozzle-shaped volume /3/ where gliding electric discharges /4/ may develop. This reactor contains a simple nozzle /5/ with a diameter of 4 mm, blowing the premixed fluid /6/ to be converted in the space /7/ between the electrodes arranged so that the fluid flows along the central part of these electrodes exposed to the discharges. Another more complex "double nozzle" (but not shown in this FIG. 1) can also be used; it consists of two concentric pipes through which arrive the hydrocarbon feedstock, possibly mixed with water vapor, and the oxygen or oxygen-enriched air, or even the atmospheric air, all three being eventually mixed with water vapor. In this case, the reactants are mixed in such new "double nozzle" or even outside of it, just near the electrodes. Several nozzles may be arranged in the same reactor. The roots /8/ of the discharges that blow up and preionize the gas at the point /9/ where the distance between the electrodes is the smallest, glide on these electrodes and disappear at the point /10/ near the end of the electrodes, to reappear once again at the initial point. The process is sequential and the lifetime of a discharge /4/ observed ranges from 1 to 20 ms, depending on the linear speed of the fluid in zones /7/, /9/, /3/ and /10/, between the electrodes /2/. Given the moderate temperature (<1200° C.) of the electrodes and a very short contact time of the discharge feet with the electrodes, even in uncooled steel, we do not observe any deterioration that may prevent the gliding of these current-limited discharges. The gliding discharges /4/ have variable characteristics from the point /9/ where they are initiated to their extinction /10/ with, in particular, dissipation of energy that increase over time. The tubular reactor is closed by two covers. One of them /11/ supports the electrodes that are isolated electrically with high voltage connections /12/. The other /13/ closes the reactor on the other side and comprises a product ouput tube /22/. The entire structure is airtight; it supports both a partial vacuum of 7 kPa and an overpressure of 6 bar. A perforated metal or ceramic plate /14/ separates a plasma zone /15a/ and a post-plasma zone /15b/ partially filled with solid material. The two zones are housed within the same reactor /1/. The plate /14/ makes it possible to run products from the plasma treatment to the post-plasma zone /15b/. The reactor (outer diameter of 85 mm and height of 88 cm) is insulated externally by a ceramic felt /16/. We packed the inner walls of the post-plasma zone of the reactor with a ceramic tube /17/ with an inner diameter of 55 mm. The plasma zone is insulated by a heat resisting felt /18/. The total free volume (in terms of fluid) inside the reactor is 1.9 $dm^3$. The volume of the solid material /19/ inserted in the post-plasma zone /15b/ (in most cases we use metal Ni sticks with a total mass of 1.5 kg) is 170 $cm^3$, which corresponds to a geometric surface of 1670 $cm^2$. The ratio between the volumes of solid material inserted in the post-plasma zone and the unfilled volume of this zone is only 1 to 6.5, while the ratio between the volumes of the plasma zone /15a/ and that of the post-plasma zone is 1 to 2.4. No part of the reactor is cooled in a forced manner. The incoming fluids /6/ are mixed away from the injection nozzle /5/, in the nozzle itself, or even near the nozzle. They may be preheated together or separately with a controlled temperature resistance furnace /20/. This last method would even be preferable for an industrial reactor, in order to prevent the early combustion $O_2$+HC during the preheating. Two holes in the cover /13/ provide for the connection of a pressure gauge /21a/ and for the insertion of a thermocouple wire /21b/. The products of the conversion exit the reactor through a tube /22/. With a quicker ($\geq$10 m/s) and almost punctual injection of the fluid between the electrodes /2/, we already provoke a phenomenon of recirculation /23/ of the reactants in the gliding discharge zone /15a/. In order to reinforce this recirculation, we also add this separating plate /14/, thus dividing the reactor in two parts: an electric discharge plasma compartment /15a/ and a post-plasma compartment /15b/. The perforated plate provides for the flow of reactants (partially consumed) and "long-living" active species resulting from the excitation of the gases by the gliding discharges. In the post-plasma zone, the conversion is thus susceptible of being completed in the presence of solid material /19/ and in an environment where the temperature is much lower than that of the walls and electrodes of the plasma zone /15a/. The fluid, once in this post-plasma zone, cannot reenter the plasma zone. The luminous zone of the gliding electric discharges, as well as part of the wall of the zone, can be observed through a glass /24/ with a diameter of 15 mm, in order to verify the proper operation of the reactor and to determine the temperature in the compartment /15a/. Very important information may be derived from the plasma emission spectrum. The conversion of NGs is generally sufficient with a single run through a single reactor. Otherwise, the products partially converted in a reactor may be reprocessed in several reactors thus described and arranged sequentially (not represented).

The presence of the perforated division plate /14/ creates a new post-plasma reactive zone /15b/, where highly active and metastable species (thus having catalytic properties) can deactivate themselves on other molecules, directly in the gaseous phase or indirectly on the surface of solid material /19/ inserted in the zone. This makes it possible to reform HCs originating from violent reactions in the plasma zone. It is also possible to advance further the conversion of the reactants. Physics provide us with information on atomic and molecular species such as $H^*$, $OH^*$, $O_2^*$, $CO_2^*$, $H_2^*$, $H_3^*$ (and many others), which have a lifetime sufficiently long to cover great distances in gas flows, even at the atmospheric pressure or at a higher pressure. This phenomenon is very important for the conversion of HCs known for their fragility. In fact, the action of a non-thermal (or non equilibrium) plasma makes it possible to avoid completely the coking of the hydrocarbon feedstock. Long operating times of the reactor thus built and a perfect transparency of the glass (all in the presence of HCs as fragile as propane and butanes) constitute the best evidence of "soft" transformations that may be carried out in such reactor, with said post-plasma compartment.

The reactor is fed controlled volumes (by mass flowmeters) of gas taken in gas cylinders (or other sources) and/or water vapor originating from a steam generator. The reactor may also be fed with water through the use of a metering pump. The constant flow of such liquid, controlled by a valve and a flowmeter, is thus evaporated in the furnace /20/, to be then injected in the reactor, being previously mixed or not with another fluid of the process.

Chemical analyses are made by using classic gas chromatography methods in a gaseous phase. We use three chromatographs, each dedicated to individual dry gases: CO, $CO_2$, $O_2$, $N_2$ and $CH_4$ for the first, only $H_2$ for the second, and all the HCs for the third. The water vapor flow in the products is calculated from material balances or quantified by the trapping of a known volume of exiting gas.

The gliding discharges inside the reactor are fed by a special high voltage system that provides both the preionization of the medium and then the transfer of electric energy to the plasma. The electric power of the reactor used varies between 0.15 and 0.56 kW under 0.12 or 0.25A for a flow rate of fluid to be treated of 1.3 to 2.6 $m^3(n)/h$; the energy supply in relation to the feedstock is 0.10 to 0.34 $kWh/m^3$ (n). However, nothing prevents the use of higher powers, flowrates and/or energy supplies for industrial applications.

EXPERIMENTAL RESULTS

Figure 2:
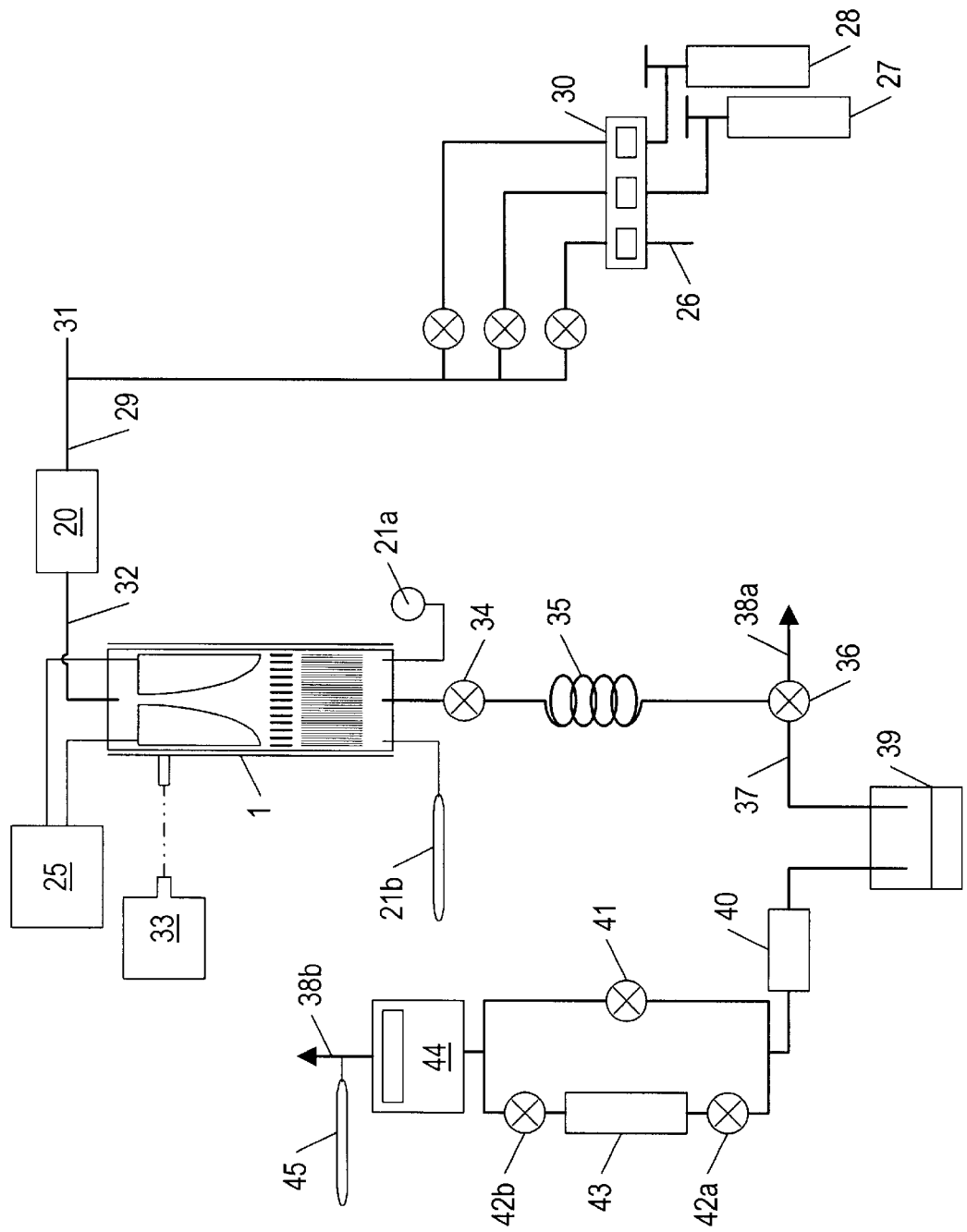
FIG. 2 is a schematic representation of a system used to test the hydrocarbon conversion process according to one embodiment of the invention.

The reforming of a NG will be better understood with the help of FIG. 2. The reactor used is that which is illustrated in FIG. 1. FIG. 2 is a schematic representation of the overall equipment. In this figure, the reactor /1/ is fed by a special high voltage electric generator /25/. This reactor is operated directly with, as a plasma forming gas, a NG taken from the city system /26/ or from a pressurized cylinder /27/ containing a simulated NG, mixed with oxygen /28/ or oxygen-enriched air 28/, or even atmospheric air /28/ and possibly water vapor (or liquid water) /29/. The gas flows are controlled by mass flowmeters /30/. The incoming gas mixture (dry) may be sampled for chromatographic analysis by a bypass /31/. The flow of water vapor is also known following the calibration of the metering pump of the device /29/. A thermocouple /32/ makes it possible to measure the temperature of the fluid at the inlet of the injection nozzle, while an optical pyrometer /33/ and a thermocouple /21b/ indicate the temperatures in the two compartments /15a/ and /15b/ of the reactor. A pressure gauge /21a/ provides at all times the pressure inside of the reactor. The products exiting the reactor are cooled in an air heat exchanger /35/. Upon exiting the exchanger, the gases are directed to a direction reversing valve /36/ that is used to redirect them either to the analysis /37/ or to the evacuation stack /38a/. During our tests, we sampled and weighted the water exiting the reactor, by condensation /39/ and absorption /40/. We also sampled the dry gas product for chromatographic analyses. To that end, we first send the humid gas to the outlet /38a/ and then, once that we consider that the reactor is operating at the desired level (stable in most cases), we reverse the valve /36/ and send the exiting product towards the analysis /37/. The water is deposited in the cooled flask /39/ and in an absorbing material /40/. Valve /41/ being previously closed and valves /42a/ and /42b/ open, the dry gas flows through a bulb or a balloon /43/, then through a gas meter /44/, and exits the experimental device through a pipe /38b/ located near the evacuation stack. The temperature of the gas exiting the meter /44/ is measured with a thermometer /45/. In each test, we also measure the atmospheric pressure with a barometer, in order to reset our volume balances to their normal conditions marked ("n").

Numerous NG reforming process viability tests were performed in the new reactor with the "post-plasma" compartment. We present only the 7 most significant test series in the form of tables. The composition (in vol. %) of the NG originating from the city distribution system changed from one week to another: $CH_4$ from 90.7 to 98.8; $C_2H_6$ from 0.9 to 6.9; $C_3H_8$ from 0.2 to 1.9; $C_4H_{10}$ from 0.1 to 0.5 (mixture of n- and isobutane); this gas contained very little nitrogen and $CO_2$. We also carefully analyzed these NGs during each test, in order to establish an accurate material balance.

Tab. 1 and Tab. 2 summarize respectively four and six examples of partial oxidation of NG with pure oxygen without the addition of water vapor. Tab. 3 summarizes seven examples of partial oxidation of the NG with pure oxygen and added water vapor, in the presence of a solid metal body inserted in the post-plasma zone of the reactor. Another body, this time ceramic, was then placed in this zone and the results of four tests with pure oxygen and added water vapor are presented in Tab. 4. Tab. 5 summarizes seven new examples of partial oxidation of the NG with oxygen-enriched air and added water vapor, in the presence of the same metal body in the post-plasma zone. Tab. 6 summarizes seven examples of partial oxidation of NG with atmospheric air in a "shortened" reactor filled (or not) with different bodies (metal or ceramic) in the post-plasma zone. Finally, Tab. 7 presents the results of 4 pairs of comparative tests with/and without discharges in the plasma zone.

In these tables, we indicate some test operational parameters and obtained results. The same abbreviations are used:

$O_2/HC$ and $H_2O/HC$—the volume ratios between these components in the mixture (reactants) entering the reactor.

SE—specific energy injected in the plasma (real electric energy of the discharges in relation to the hourly normal flow rate of all incoming reactants).

Temp.—the temperature (° C.) in the post-plasma zone (marked "post zone") or the temperature of the walls in the plasma zone (marked "pl. zone"); this last temperature may not, under any circumstances, be correlated with a "temperature" under which the partial oxidation takes place in the zone covered by our electric discharges.

$H_2/CO$—the volume or molar ratio of two gases in the product exiting the reactor.

SG/HC—the relative quantity of syngas ($H_2$+CO) produced from one volume unit of incoming HC (other gases not taken into account).

EC—the quantity of electric energy (in kWh) consumed to produce 1 $m^3(n)$ of syngas (other products such as acetylene or ethylene are considered "gratis"); this value indicates a real energy cost (in electricity directly injected into the gliding discharge) of the process at the laboratory scale.

Conv. C—the overall rate (in %) of conversion of the carbon initially contained in the NG (in "organic" form in saturated HCs) into any other "mineral" (CO and $CO_2$) or unsaturated "organic" (acetylene or ethylene) forms; at this point, it is appropriate to note the absence of coke, soot, tar or any other pyrolytic compound in our products (within the limit of 0.5% expressed in mass of converted carbon), which helps us establish our material balances from gaseous compounds.

Con. $O_2$—the overall rate (in %) of conversion of element oxygen added to the hydrocarbon feedstock into any other form (CO, $CO_2$ and $H_2O$).

Selectivities—the relative rates (in %) of conversion of carbon or hydrogen present initially in the NG and transformed into another useful or parasitic product.

Therefore, Tab. 1 summarizes the four tests 20 to 23 of partial oxidation of a NG with oxygen without added water vapor. Whenever we use the term "added", we emphasize the external origin of this reactant which appears anyway (but in a lesser quantity) as a product of further oxidation reactions (11) and (12). The NG (with a volume composition of 97.3% $CH_4$, 1.4% $C_2H_6$, 0.3% $C_3H_8$ and 0.1% $C_4H_{10}$) is mixed with pure oxygen according to a constant $O_2$/HC ratio of 0.48, and then injected into the reactor without preheating. The flow rate of the mixture (1.3 $m^3(n)$/h), the pressure in the reactor (1.5 bar) and the electric supply settings are maintained constant. The reactor, initially cold at the beginning of the tests, is heated progressively and the exiting products are sampled when the thermocouple installed in the post-plasma zone indicates the temperatures listed in column 2 of the table. At that time, we also measure the electric powers dissipated in the plasma zone. They are not strictly constant due to the evolution of the temperatures of all the elements of the plasma zone, but the specific energy SE varies little: 0.29±0.03 kWh/$m^3(n)$.

TABLE 1

| Ex. | Temp. °C. | $H_2$/CO | SG/HC | EC | Conv. C | Selectivities (%) CO | $CO_2$ | $H_2O$ |
|---|---|---|---|---|---|---|---|---|
| 20 | 130 | 0.46 | 0.22 | 2.3 | 32 | 46 | 44 | 68 |
| 21 | 320 | 1.4 | 0.97 | 0.4 | 52 | 77 | 20 | 39 |

TABLE 1-continued

| Ex. | Temp. °C. | $H_2$/CO | SG/HC | EC | Conv. C | Selectivities (%) CO | $CO_2$ | $H_2O$ |
|---|---|---|---|---|---|---|---|---|
| 22 | 480 | 1.6 | 1.3 | 0.3 | 58 | 83 | 15 | 30 |
| 23 | 620 | 1.6 | 1.3 | 0.3 | 59 | 84 | 15 | 30 |

The results of this series of tests inform us that it is preferable to convert a NG when the post-plasma zone reaches a temperature of at least 480° C. since, for lower temperatures, all performance indicators of the process are less good. Thus, by going from 130° C. to 480° C., we get closer to the desired $H_2$/CO ratio ~2. We obtain almost 6 times more syngas from a unit volume of HCs, and this at an energy price over 7 times better. These great improvements are also visible from other figures: the (absolute) conversion of carbon increases 1.8 times, and this rather towards the desired product (the selectivity towards CO goes from 46% to 83%) than to the undesired molecule (the selectivity towards $CO_2$ goes from 44% to 15%). By increasing the temperature in the post-plasma zone, we also conserve much more elemental hydrogen $H_2$ by lowering (from 68% to 30%) the relative selectivity of water vapor formation. We can also observe that a temperature increase in the post-plasma zone of more than 480° C. does not lead to an improvement of the process. Note also that the temperature of all solid elements present in the plasma zone easily exceeds 900° C. for all these tests.

Tab. 2 summarizes the six tests 27a to 30 and 67 to 68 of partial oxidation of a NG with oxygen without added water vapor. The "light" NG (with a volume composition of 96.6% $CH_4$, 2.6% $C_2H_6$, 0.6% $C_3H_8$, and 0.2% $C_4H_{10}$ for tests 27a to 30, and 98.8% $CH_4$, 0.9% $C_2H_6$, 0.2% $C_3H_8$, and 0.1% $C_4H_{10}$ for tests 67 and 68) is mixed with pure oxygen in variable $O_2$/HC ratios=0.49 to 0.65, and then injected into the reactor without preheating. For a constant pressure of 1.5 bar (except exp. 68 for 2.0 bar), the flow rate of the incoming mixture (1.3 to 1.6 $m^3(n)$/h) and the settings of the electric supply are quasi-constant. This time, the entire reactor is closer to its thermal plateau and we observe SE values that are almost constant at a level intentionally kept low: 0.15±0.03 kWh/$m^3(n)$. At this SE level, we add very little energy to the partial combustion of the NG; instead we "electrify" it.

TABLE 2

| Ex. | $O_2$/HC | Temperature (° C.) Pl. zone | Post zone | $H_2$/CO | SG/HC | EC | Conv. C % | Selectivities (%) CO | $CO_2$ | $H_2O$ |
|---|---|---|---|---|---|---|---|---|---|---|
| 30 | 0.49 | 1055 | 735 | 1.55 | 1.2 | 0.16 | 57 | 84 | 15 | 33 |
| 29 | 0.52 | 1065 | 685 | 1.58 | 1.4 | 0.15 | 63 | 84 | 15 | 30 |
| 28 | 0.55 | 1065 | 620 | 1.57 | 1.5 | 0.12 | 67 | 85 | 14 | 30 |
| 27a | 0.60 | 1115 | 480 | 1.66 | 1.8 | 0.13 | 79 | 87 | 12 | 25 |
| 67 | 0.65 |  | 610 | 1.94 | 2.6 | 0.11 | 100 | 89 | 11 | 13 |
| 68 | 0.65 |  | 670 | 1.95 | 2.8 | 0.12 | 100 | 90 | 10 | 11 |

The results of this series of tests inform us that it is preferable to convert a NG when the $O_2$/HC ratio reaches a value near 0.65. At this level, we obtain very good results of total conversion (100%) of carbon and oxygen under 1.5 bar, we approximate the desired $H_2$/CO ratio, we produce 2.6 $m^3$ of syngas per 1 $m^3$ HC, at the very low unit energy price EC of 0.11 kWh per 1 $m^3(n)$ of syngas. These performances are also visible from the selectivities of the conversion of carbon. Curiously, these figures evolve rather towards the desired product (the selectivity towards CO is 89%) than towards the parasitic $CO_2$. Another surprising point is that, by increasing the $O_2/HC$ ratio, we produce much more elemental hydrogen $H_2$ and the selectivity of formation of water vapor decreases from 33% to 13%.

A pressure increase from 1.5 to 2.0 bars results beneficial for the quantity of syngas produced from a unit volume of HCs. That is also visible in the figures pertaining to the carbon conversion rate, as well as on the selectivities towards CO and undesired products. We also performed other tests under a pressure approximating 6 bars. We currently consider this limit as the maximum value with which our equipment will work in a stable and problem-free manner. Furthermore, we are considering developing a partial oxidation of HCs under relatively low pressures for specific applications such as the chemical conversion of petroleum associated gas (otherwise burned by the flares at quasi-atmospheric pressures), the biogases produced in low pressure digesters, hydrocarbon permeates resulting from a membrane separation, etc. Our relatively low pressure process thus makes it possible to avoid energy-starved compressors and facilities with a higher technological requirements due to the classic high pressure technology of the catalytic auto-thermal process.

Tab. 3 summarizes the seven tests 38b to 44 of partial oxidation of a NG with oxygen and added water vapor. The question was whether we could convert a NG with a little less oxygen by replacing it with water vapor, while maintaining at the same time a relatively low energy price (EC) for syngas with a composition similar to the $H_2/CO$ ratio=2. The target NG selected was slightly heavier: 91.6% $CH_4$, 6.2% $C_2H_6$, 1.7% $C_3H_8$ and 0.5% $C_4H_{10}$. It was mixed with pure oxygen and water (injected in liquid form before being evaporated in the furnace) in variable (molar) proportions: $O_2/HC$=0.25 to 0.64, $H_2O/HC$=0.58 or 1.0. A light preheating (between 115 and 150° C.) was used exclusively to evaporate the water. For a constant pressure of 1.5 bar, the flow rate of the mixture (1.7 to 2.0 $m^3(n)/h$) and the electric supply settings were almost constant. The reactor was close to its thermal plateau and we observed almost constant SE values at a level of 0.24±0.02 $kWh/m^3(n)$.

deficit of $O_2/HC$=0.33 (this is equivalent to a molar ratio $O_2/C$=0.31), provided that this missing oxidizing agent is replaced by water vapor. Another advantage that could justify using water vapor together with oxygen is that a relatively high quantity of ethylene and acetylene may be created in the syngas (see exp. 44). By comparing exp. 38b and 39, we observe that a limited addition of $H_2O$ makes it possible to lower the EC; we thus demonstrate that it is possible to add a well proportioned quantity of $H_2O$ in order to achieve a particular goal. Note that the overall limited conversion rate in some of the experiments presented herein (and in the tables that follow) can be easily brought to 100% by injecting more energy and/or by reducing the flow of NGs entering the reactor (this is equivalent to increasing the SE). We should also add that by analyzing individually the conversion rates of each HC, we observe that the heavier HCs react more readily. For example, for an overall carbon conversion rate equal to 32.6% in exp. 44, the butanes and the propane are fully converted, the ethane is converted at 96.6%, while the conversion of methane is limited to 19.2%. Therefore, our process of partial oxidation assisted by gliding discharges could be applied regardless of the HC content of a NG (or other hydrocarbon mixture) to be converted.

Tab. 4 summarizes the four tests 46 to 49 of partial oxidation of a NG with oxygen and added water vapor in the presence of another inert material in the post-plasma compartment. In fact, instead of metal sticks present in the zone during the tests summarized in Tab. 1 to 3, we filled this zone with large pieces of chamotte. The question was: is the mixed conversion $O_2+H_2O$ of a NG sensitive to the nature of the solid introduced in the post-plasma zone? The "heavy" NG tested had the following composition: 90.7% $CH_4$, 6.9% $C_2H_6$, 1.9% $C_3H_8$, and 0.5% $C_4H_{10}$ (therefore, very close to the composition of the NG tested during tests 38b to 44). It was mixed with pure oxygen and water in variable (molar) proportions: $O_2/HC$=0.22 to 0.58, $H_2O/HC$=0.72 to 1.22. A light preheating (150° C.) was used exclusively to evaporate the water. For a constant pressure of 1.5 bar, the flow rate of the mixture (1.6 to 2.1 $m^3(n)/h$) and the electric supply settings were almost constant. The

TABLE 3

| Ex. | $O_2/HC$ | $H_2O/HC$ | Temperature (° C.) P1. zone | Post zone | $H_2/CO$ | SG/HC | EC | Conv. C % | CO | $CO_2$ | Selectivities (%) $H_2O$ | $C_2H_2$ |
|---|---|---|---|---|---|---|---|---|---|---|---|---|
| 38b | 0.64 | 0.58 | 1085 | 720 | 1.92 | 1.9 | 0.28 | 76 | 79 | 21 | 0.3 | 0.02 |
| 39 | 0.64 | 1.0 | 1060 | 840 | 2.04 | 1.5 | 0.39 | 67 | 67 | 32 | 0.6 | 0.06 |
| 40 | 0.56 | 1.0 | 1060 | 860 | 2.04 | 1.4 | 0.46 | 61 | 69 | 30 | 0.9 | 0.07 |
| 41 | 0.48 | 1.0 | 1040 | 870 | 2.05 | 1.2 | 0.45 | 54 | 69 | 30 | 1.3 | 0.07 |
| 42 | 0.41 | 1.0 | 1025 | 870 | 2.19 | 0.99 | 0.55 | 44 | 65 | 32 | 2.9 | 0.15 |
| 43 | 0.33 | 1.0 | 1005 | 870 | 1.89 | 0.83 | 0.69 | 40 | 67 | 27 | 5.7 | 0.19 |
| 44 | 0.25 | 1.0 | 965 | 860 | 1.80 | 0.61 | 0.98 | 33 | 62 | 24 | 14 | 0.32 |

The results from this series of tests show us that it is possible to obtain a mixture very close to the ideal mixture of $H_2/CO$=2, by oxidizing the hydrocarbon feedstock with a reactor was more or less at its thermal plateau and we observed almost constant SE values at a level of 0.24±0,04 $kWh/m^3(n)$.

TABLE 4

| Ex. | $O_2/HC$ | $H_2O/HC$ | Temperature (° C.) P1. zone | Post zone | $H_2/CO$ | SG/HC | EC | Conv. C % | CO | $CO_2$ | Selectivities (%) $C_2H_4$ | $C_2H_2$ |
|---|---|---|---|---|---|---|---|---|---|---|---|---|
| 46 | 0.58 | 0.02 | 1030 | 850 | 1.65 | 1.2 | 0.48 | 61 | 66 | 24 | 4.2 | 5.3 |
| 47 | 0.39 | 0.81 | 1025 | 880 | 1.58 | 0.9 | 0.51 | 48 | 67 | 22 | 6.5 | 4.3 |

TABLE 4-continued

| | | | Temperature (° C.) | | | | | Conv. | Selectivities (%) | | | |
|---|---|---|---|---|---|---|---|---|---|---|---|---|
| Ex. | $O_2$/HC | $H_2O$/HC | P1. zone | Post zone | $H_2$/CO | SG/HC | EC | C % | CO | $CO_2$ | $C_2H_4$ | $C_2H_2$ |
| 48 | 0.24 | 0.72 | 975 | 910 | 1.54 | 0.7 | 0.63 | 37 | 64 | 18 | 13 | 3.9 |
| 49 | 0.22 | 1.22 | 935 | 905 | 1.86 | 0.5 | 1.4 | 31 | 52 | 19 | 25 | 3.2 |

The results from this series of tests show us that it is possible to obtain a mixture very close to the ideal mixture of $H_2$/CO=2, by oxidizing the hydrocarbon feedstock with a deficit of $O_2$/HC=0.22 (this is equivalent to a molar ratio $O_2$/C=0.20), provided that this missing oxidizing agent is replaced by water vapor. We can now create a greater quantity of ethylene and acetylene in the syngas (see exp. 49). The comparison of two series of tests presented in tables 3 and 4 indicates the possibility of controlling closely the ethylene and acetylene contents in the syngas, by acting on the nature of the solid material placed in contact with the flow of gas resulting from the electro-treatment in the plasma zone of gliding electric discharges. The relatively high energy price EC is not surprising as it does not take into account these two very energy intensive products of the process (refer back to the definition of EC).

Tab. 5 summarizes the seven tests 51 to 57 of partial oxidation of a NG with oxygen-enriched air and eventually mixed with water vapor. The questions were whether we could convert a NG with such enriched air (for example, of membrane origin and thus much less expensive and more readily available than the pure oxygen of cryogenic origin) and whether we could obtain a syngas at a reasonable energy price, while also having a $H_2$/CO ratio of approximately 2. The target NG selected was quite heavy: 91.2% $CH_4$, 6.5% $C_2H_6$, 1.7% $C_3H_8$, and 0.5% $C_4H_{10}$. It was mixed with enriched air containing 43% oxygen and eventually with water in variable (molar) proportions: $O_2$/HC=0.73 to 0.94, $H_2O$/HC=0 to 0.28. A light preheating (between 170 and 180° C.) was used exclusively to evaporate the water in exp. 56 and 57. The pressure ranged from 1.6 to 1.9 bar for incoming mixture flow rates comprised between 1.9 and 2.6 $m^3$(n)/h. The reactor was close to its thermal plateau and we observed almost constant SE values at a level of 0.22±0.04 kWh/$m^3$(n).

and very reasonable selectivities towards all valuable products. The energy cost EC is also approximately twice that of the tests performed with pure oxygen, but it remains at a very low level of approximately 0.24 kWh/$m^3$(n). We observe that the addition of water vapor in exp. 56 and 57 generates well the reaction (10) of "water shift" (lower selectivity towards $H_2O$, greater selectivity towards $CO_2$) and also a blocking of the pyrolysis of HCs into ethylene and acetylene. In spite of the presence of a strong nitrogen ballast (between 28 and 38% vol. in the incoming flow), we are able to maintain, thanks to the energy and to the active species present in the plasma zone, a reactive environment that promotes the development of the reactions for the partial oxidation of HCs. That is seen at the level of the temperatures that are still quite high in the two zones of the reactor.

A strong ballast (up to 40% by volume) of carbon dioxide, $CO_2$, present in some NGs that we also tested does not prevent the smooth conversion of HCs into syngas. Such ballast can be compared to the ballast of inert nitrogen, although a fraction of $CO_2$ may actively escape through reactions (15) and (16), upon the conversion of the original HC carbon into CO, which increases the content of this valuable product, We also observe that the $CO_2$ present in the mixture to be converted plays a positive role by preventing the formation of soot by the following reaction:

$$C+CO_2=2CO. \qquad (17)$$

Another series of tests was carried out with atmospheric air mixed with a light NG. This entire mixture was subjected

TABLE 5

| | | | Temperature (° C.) | | | | | Conv. | Selectivities (%) | | | | |
|---|---|---|---|---|---|---|---|---|---|---|---|---|---|
| Ex. | $O_2$/HC | $H_2O$/HC | P1. zone | Post zone | $H_2$/CO | SG/HC | EC | C % | CO | $CO_2$ | $H_2O$ | $C_2H_4$ | $C_2H_2$ |
| 51 | 0.94 | 0 | 1095 | 585 | 1.50 | 2.2 | 0.33 | 95 | 84 | 15 | 32 | 1.1 | 0.89 |
| 52 | 0.85 | 0 | 1070 | 880 | 1.58 | 2.3 | 0.30 | 94 | 85 | 13 | 27 | 1.2 | 0.76 |
| 53 | 0.74 | 0 |  | 930 | 1.66 | 2.2 | 0.31 | 86 | 85 | 12 | 23 | 1.9 | 1.1 |
| 54 | 0.69 | 0 |  | 945 | 1.72 | 2.2 | 0.31 | 82 | 86 | 12 | 21 | 1.7 | 0.73 |
| 55 | 0.73 | 0 | 1000 | 755 | 1.74 | 2.3 | 0.18 | 87 | 85 | 15 | 20 | 0.28 | 0.06 |
| 56 | 0.73 | 0.28 |  | 830 | 1.91 | 2.4 | 0.23 | 90 | 81 | 19 | 15 | 0.14 | 0 |
| 57 | 0.73 | 0.66 |  | 875 | 2.06 | 2.3 | 0.25 | 88 | 76 | 24 | 13 | 0.06 | 0 |

The results from this series of tests show us that it is possible to obtain a mixture very close to the ideal mixture of $H_2$/CO=2 (exp. 56 and 57), by oxidizing partially the hydrocarbon feedstock with enriched air (43% $O_2$) and by adding a small amount of water vapor. We obtain very good syngas/HC volume ratios, a sufficient carbon conversion rate to the action of gilding electric discharges in another "shortened" reactor (30 cm total length), with little thermal insulation. All other details of the equipment were the same, except that the reactor only had one large hole to separate the plasma zone from the post-plasma zone. Some results of these seven tests are presented in Tab. 6.

TABLE 6

| Ex. | O$_2$/C | SE | Post-plasma zone Filled | Temp (° C.) | H$_2$/CO | SG/HC | EC | Conv. (%) C | O$_2$ | CO | Selectivity (%) CO$_2$ | C$_2$H$_4$ | C$_2$H$_2$ |
|---|---|---|---|---|---|---|---|---|---|---|---|---|---|
| P5 | 0.36 | 0.73 | St. Steel A | 560 | 1.43 | 0.52 | 3.9 | 34 | 93 | 58 | 24 | 16 | 0 |
| P6 | 0.36 | 0.61 | Cu | 730 | 0.59 | 0.20 | 8.3 | 23 | 90 | 51 | 34 | 13 | 0 |
| P7 | 0.36 | 0.72 | Chamotte | 440 | 1.86 | 0.51 | 3.9 | 30 | 58 | 69 | 18 | 11 | 1.5 |
| Pu1 | 0.32 | 0.57 | None | 390 | 2.40 | 0.70 | 2.3 | 31 | 33 | 51 | 11 | 16 | 22 |
| Pu2 | 0.23 | 0.60 | None | 390 | 3.05 | 0.43 | 2.7 | 26 | 34 | 49 | 12 | 7.5 | 31 |
| Pe1 | 0.31 | 0.56 | St. Steel B | 440 | 1.73 | 0.52 | 2.9 | 35 | 90 | 50 | 34 | 14 | 1.1 |
| Pe2 | 0.23 | 0.58 | St. Steel B | 450 | 1.99 | 0.38 | 2.9 | 27 | 87 | 51 | 37 | 12 | 1.5 |

This time, under a pressure of 1.1 bar and with significant energy losses preventing the reactor from increasing its temperature (especially in the plasma zone), which would have made it possible to ensure a sufficient build-up of thermal energy from reactions (11), (12), (1) and (2), and cause an "inflammation" of the reactor, we did not obtain very good results. However, this series of tests shows us the viability of a partial oxidation of HCs with atmospheric air, This oxidation may even be carried out with a very strong deficit of oxygen (O$_2$/C=0.23), but it is only possible in the presence of gliding electric discharges, otherwise the purely auto-thermal process would stop very quickly (here the inertia of the reactor is quite small). We must point out the strong influence of the material introduced in the post-plasma zone on the chemical composition of the products. We can thus obtain more or less unsaturated hydrocarbons, almost block the production of hydrogen on large pieces of metal copper, regulate the H$_2$/CO ratio, etc.

convert the entire hydrocarbon feedstock and then send it to a syncrude FT synthesis. Everything indicates that a combination of the auto-thermal process with electric discharges provides a new opening towards more interesting products (presence of ethylene and acetylene), obtained from the light or heavy feedstocks of HCs, partially oxidized by oxygen or by O$_2$ enriched air, or even by the atmospheric air, all under a low pressure of less than 6 bars.

We thus arrive at the very important questions of whether it is really our gliding electric discharge that produces such a smooth production of syngas and what would happen if we completely shutdown the electric supply of these discharges, causing their complete disappearance once that the reactor reaches its steady operating condition. The items included in Tab. 7 answer these basic questions.

TABLE 7

| ex. | post-p1. zone | O$_2$/HC | H$_2$O/HC | temperature (° C.) p1. zone | post zone | SE | H$_2$/CO | SG/HC | EC | conv. (%) C | O$_2$ | CO | Selectivity (%) CO$_2$ | H$_2$O |
|---|---|---|---|---|---|---|---|---|---|---|---|---|---|---|
| 25 | Ni | 0.40 | 0 | | 775 | 0.10 | 1.40 | 0.66 | 0.21 | 38 | 98.7 | 73 | 23 | 44 |
| 26 | Ni | 0.40 | 0 | | 840 | 0 | 1.34 | 0.51 | 0 | 34 | 98.6 | 63 | 32 | 49 |
| 33 | Ni | 0.63 | 0 | 1030 | 690 | 0.14 | 1.66 | 1.92 | 0.11 | 84 | 99.3 | 85 | 14 | 25 |
| 34 | Ni | 0.63 | 0 | 975 | 770 | 0 | 1.65 | 1.79 | 0 | 81 | 99.8 | 83 | 17 | 27 |
| 44 | Ni | 0.25 | 1.00 | 965 | 860 | 0.27 | 1.80 | 0.61 | 0.98 | 33 | 97.0 | 62 | 24 | 24 |
| 45 | Ni | 0.25 | 1.00 | <600 | 900 | 0 | 0.84 | 0.20 | 0 | 21 | 82.1 | 49 | 25 | 51 |
| 49a | chamotte | 0.22 | 1.22 | 930 | 900 | 0.33 | 1.73 | 0.42 | 1.87 | 30 | 97.1 | 47 | 20 | 32 |
| 50 | chamotte | 0.22 | 1.22 | <600 | 990 | 0 | 1.34 | 0.32 | 0 | 27 | 91.4 | 47 | 18 | 39 |

By comparing Tables 1 to 6, we observe that it is possible to partially oxidize and pyrolyze a light or heavy NG, with or without the addition of water vapor, within a very wide range of O$_2$/HC and H$_2$O/HC ratios, in the presence of an initially non-catalytic metal or ceramic material in the post-plasma zone, in order to obtain a syngas more or less accompanied by ethylene and acetylene without (or almost) soot. A free choice of the solid material placed in contact with the post-plasma flow and the free choice of its temperature provide us with wide possibilities for directing the composition of the exiting product according to the requirements, depending on the composition of the hydrocarbon feedstock, the availability of oxygen, etc. Also, by injection more or less electric energy directly into the discharges (see SE values), we can convert more or less HCs into syngas. For example, we can obtain a natural gas that is only seeded with hydrogen and carbon monoxide, in order to provide for its improved combustion in piston engines (in this case, the unconverted oxygen does not present a problem) or for lo its transportation via a traditional gas pipeline to a civilized location where the CO and/or H$_2$ would be extracted for a more noble use. We could also The tests without discharges performed in the "long" and very well insulated reactor follow those performed with discharges, without modifying any of the settings. Thus, exp. 26 performed at a pressure of 1.7 bar, exp. 34 at 1.6 bar, exp. 45 a 1.3 bar, and exp. 50 at 1.5 bar were carried out respectively 26, 21, 44 or 9 min. after the preceding experiments. It should be added that this reactor is quite massive and cools very slowly. We observe a partial oxidation process a long time after the shutdown of the electric discharges, but, in this case, all indicators of the quality of the conversion of NG into syngas are lower than those in the presence of the discharges. The 33/34 pair indicates that the temperature in the "plasma" zone (but without plasma in exp. 34) does not decrease much as the relatively high ratio O$_2$/HC=0.63 generates enough oxidation energy to compensate for the thermal losses of the zone. That is not the case during exp. 45 and 50, where the temperature falls quickly (in less than 2 min) below the threshold of our pyrometric measurements (600° C.). Nonetheless, the temperature in the post-plasma zone increases progressively, reaches a maximum (at which point we sample the product for the analysis), and finally falls very quickly to a threshold below which the conversion stops. However, at the beginning, the temperature of the solids introduced in the post-plasma zone (Ni or chamotte) increases due to side reactions (11) and (12) "Synthesis Gas, Report No. 148A", SRI International, Menlo Park, Calif. The data and balances (recalculated by us) are also included in Tab. 8 under a SRI heading.

TABLE 8

| Ref. | Pres. (bar) | $O_2/C$ | $H_2O/C$ | Preheat. (° C.) NG/$H_2O$ | $O_2/H_2O$ | $H_2/CO$ | SG/NG | Sel. (%) CO | $CO_2$ |
|---|---|---|---|---|---|---|---|---|---|
| HT-1 | 34 | 0.55 | 2.5 | 660 | 560 | 3.63 | 2.70 | 60 | 40 |
| HT-2 | 35 | 0.60 | 3.0 | 605 | 505 | 4.02 | 2.70 | 55 | 45 |
| HT-4 | 25 | 0.58 | 1.9 | 525 | 230 | 3.29 | 2.59 | 61 | 39 |
| HT-5 | 25 | 0.54 | 1.4 | 525 | 230 | 2.84 | 2.61 | 70 | 30 |
| SRI | 68 | 0.66 | 0.51 | 371/295 | 149 | 2.10 | 2.66 | 83 | 17 | that are highly exothermic (the selectivities towards $CO_2$ and $H_2O$ increase for all pairs). In spite of this temperature increase, the oxygen conversion becomes stagnant or even decreases. Without electric discharges to assist the conversion, we find, in spite of a large surplus of fuels, a very high content of element oxygen which, if not separated, would exhaust the catalysts of a FT process for which the syn-as is produced.

However, everything indicates that it is indeed the presence of gliding electric discharges on the electrodes immersed in a very rich fuel/oxidant mixture in the plasma zone that provide for the smooth execution of the process that is the subject of this application. Furthermore, the still active flow of intermediate products exiting the plasma zone undergoes a post-plasma conversion in the presence of a non-catalytic solid (chamotte) or a metal (Ni) known for its catalytic properties, provided that it is highly dispersed. Given the ridiculous surface of the metal (less than 1700 cm² per 1.5 kg), only one conclusion can be drawn: the inert or quasi-inert material introduced in the post-plasma zone plays the role of a catalyst only in the presence of a flow of products exiting the plasma. Without this constant flow from the plasma, this material deactivates itself very quickly and even begins to play a reverse role from the desired reaction.

Our preferred material would be Ni, although other solid materials may be even more advantageous. The volume of the reactor zone housing the Ni sticks is 660 cm³. Under the conditions of exp. 33/34, this volume, which comprises a Ni (geometric) surface of 1670 cm², is covered by a flow of products of approximately 6.6 m³/h (at the pressure and temperature of the zone). This gives a space velocity of approximately 10,000 h⁻¹.

DISCUSSION

The comparison of our results, as provided in Tab. 1 to 7, with the results obtained from the documentation indicates the superiority of the device described above compared to a classic $O_2$/HC burner used in an auto-thermal process. For reference, we will select the details published by Haldor Topsoe (Denmark) in the article of CHRISTENSEN and PRIMDAHL mentioned above. Although the information is incomplete, we are able to establish a few material balances of the industrial process using only the chemical energy of more or less exothermic reactions (11), (12), (1) and (2). Since we do not have any information regarding the composition of the NG treated, we compare it to pure methane. Tab. 8 summarizes the data (marked HT) obtained from said article.

Another comparison is made with relatively complete data published in November 1995 by S. C. NIRULA in We must first note that these are thermo-catalytic processes under high pressure. Exposed to a flame relatively rich in oxygen (theoretically, we should stop at $O_2$/HC~0.5) at more than 2000° C., the HCs are consumed preferentially into $CO_2$ and $H_2O$ according to reactions (11) and (12), rather than (1) and (2), leaving large unconsummated quantities of HCs (mainly the chemically strongest methane). It is only in the presence of a large mass of brittle catalyst that the total conversion of HCs is completed according to the endothermic reforming, reactions (3), (4), (15) and (16), on a catalytic bed exposed to very high temperatures (1100 to 1400° C). This catalyst and its support should thus exhibit a very high resistance and very good stability under these severe conditions.

CHRISTENSEN and PRIMDAHL do not mention any $O_2$/C ratio lower than 0.54 or any $H_2O$/C ratio lower than 0.58 in any industrial example or pilot test. On the contrary, they emphasize the need to add at least these quantities of oxygen and water vapor to ensure the appropriate operation of their burner, which also requires a special recirculation. However, we can reduce these ratios to 0.22 and zero, respectively, since we have another adjustment device: the very active energy of electric discharges added to the highly substoichiometric flame.

The report of NIRULA provides some information regarding the volume of the industrial reactor (94 m³) and the flows of incoming gas (200,000 m³(n)/h). From the analyses of gas at the outlet of the reactor, we were able to calculate the space velocity of the reactor, which operates under 68 bars and at a very high outlet temperature of 1350° C. This velocity is approximately 310 h⁻¹, which does not compare at all with ours which, even brought to the total volume of the reactor, is 3500 h⁻¹.

We demonstrate for the first time the viability of a new process for the conversion of NGs assisted by gliding discharges in the presence of oxygen or oxygen-enriched air, or even atmospheric air, with an eventual addition of water vapor. This process is illustrated in Tab. 1 to 7 by the conversion of different NGs in a new reactor of which the plasma compartment (zone) (with all the electrodes) is brought to a temperature not exceeding 1200° C. Another post-plasma compartment (zone) communicates directly with the plasma compartment through a perforated separation (or even without separation). This post-plasma zone, at a temperature of less than 1100° C., can be filled partially with a metal or ceramic solid material which, in contact with a flow of treatment products derived from the plasma hydrocarbon feedstock, becomes active and contributes to the total or quasi-total conversion of HCs into syngas, with a cogeneration of more or less ethylene and acetylene. In the presence of oxygen and eventually added water vapor, we are thus able to convert all HCs such as $CH_4$, $C_2H_6$, $C_3H_8$ and/or $C_4H_{10}$ into synthesis gas and also, partially, into other valuable products. $C_2H_4$ and $C_2H_2$. This is performed without using any conventional catalysts.

A wide range of relative ratios between of two oxidizing agents ($O_2$ and $H_2O$) and the HCs may be used. Our examples are given for values of $O_2$/HC comprised between 0.22 and 0.94, and $H_2O$/HC between 0 and 1.22, but it is clear that we could still increase these two limits at will from zero to infinity since our gliding discharges can be generated both in pure oxygen and in pure water vapor. Thus, all mixtures of $H_2O$/$O_2$/NG can be converted in the reactors described herein. Depending on the needs, we can obtain a synthesis gas with a $H_2$/CO ratio approximating 2 for the synthesis of a synthetic petroleum, or methanol, or a synthesis gas very rich in hydrogen for the synthesis of ammonia, or still a gas very rich in CO for syntheses denominated "oxo". These examples are intended to be illustrative and not restrictive.

Note the total or quasi-total absence of soot, coke or other nuisance products during the conversion of heavy HCs such as the butanes that were present in non-negligible quantities during some tests. On the contrary, the increasing fragileness of the increasingly heavy HCs is a "plus" for our process in terms of the energy cost for the production of syngas and also of other valuable unsaturated products. This is a strong point of our process compared to the traditional processes that are faced with the problem of coke and tar deposits, especially in the presence of HCs heavier than methane.

Finally, it is appropriate to note the presence of non-negligible (but with adjustable contents) quantities of unsaturated hydrocarbons $C_2H_4$ and $C_2H_2$ in our products of conversion assisted by gliding discharge plasma. They have an added value as a final commercial product or as prime material for other organic syntheses. Mixed with synthesis gas, they also promote the construction of hydrocarbon chains during the FT synthesis (information derived from recent scientific work conducted by Professor A. LAPIDUS of the Institute of Organic Chemistry, Moscow). Thus, formed simultaneously with the CO and $H_2$ during the conversion of hydrocarbons in the gliding discharges, these unsaturated molecules can contribute to the direct implementation of an improved FT synthesis of liquid hydrocarbons.

On a more technical level, it should be noted that the reactor and its assembly operate with surprising smoothness, without deterioration of the electrodes, electrode holders, perforated diaphragm, or walls of the reactor, or the post-plasma zone, all of which undergo the action of incoming reactants and exiting products. We must add that we never changed the Ni sticks in the post-plasma zone; they underwent severe temperature (from 20 to 990° C.) and pressure (1 to 6 bars) conditions, they "encountered" heavy or light HCs, all kinds of $O_2$/HC and $H_2O$/HC ratios, they worked covered with a layer of soot during some tests with very low $O_2$/HC and $H_2O$/HC ratios, they were then exposed to a plasma of air or pure oxygen, or pure $CO_2$. It is clear that their activity does not depend on a pre-treatment. They become active whenever they are exposed to the residual flow of species derived from the plasma zone.

CONCLUSION

Our experiments have demonstrated the viability of a new process for the production of gases rich in hydrogen and carbon monoxide, containing also significant quantities of $C_2H_4$ and $C_2H_2$.

The process consists in producing these gases through gliding electric discharges that glow directly in the NGs mixed with water vapor and/or pure oxygen, or oxygen-enriched air, or even atmospheric air, and this under almost any proportions. This causes the partial oxidation and/or cracking of these HCs while avoiding the shortcomings of the existing processes. The reactants, partially converted in a gliding discharge compartment, then penetrate in another post-plasma compartment that is eventually separated from the direct reaction zone by a perforated diaphragm. There, in the presence of species still active produced in the discharges and transported by the gas exiting the plasma zone, the gases undergo an additional conversion at a lower temperature than that which is present in the direct reaction zone.

Thus, the process places the partial oxidation and cracking of HCs in the active presence of water vapor and/or element oxygen, without requiring the intervention of any other reactants or catalysts, as well as without the formation of soot, coke or tar, which would hinder the proper operation of the reactor. The tests clearly demonstrate the easiness of a partial oxidation, combined with a steam reforming initiated by the addition of water vapor in the hydrocarbon feedstock, or by the water vapor created spontaneously by side reactions of over-oxidation. This partial oxidation and the steam reforming are also accompanied by the reforming with carbon dioxide present in the NG, or created by the side reactions of over-oxidation. This partial oxidation of gaseous HCs is also accompanied by a non-catalytic cracking of hydrocarbons.

The process also makes it possible to transfer directly the electric energy under high voltage and relatively low current in an exothermic reactive medium. These electrical conditions, combined with a high velocity of the plasma forming medium in the discharge zone cause a strong disturbance of the electric and also thermodynamic equilibrium. The material injected in this non equilibrium plasma zone of the gliding discharge device thus reacts in a non-thermal fashion.

No difficulties were encountered during the experiments, and an extrapolation for large volumes is easy to make. In spite of a reactor that is not optimized and another that is poorly insulated thermally, regardless of the fact that the reactants were run only once through the plasma compartment of electric discharges, followed by a single run in the post-plasma zone, a large portion (or even 100%) of the initial molecules of HCs and oxygen can be converted into synthesis gas and unsaturated hydrocarbons. This conversion is greatly improved by the quasi-punctual injection of reactants in the discharge zone with a nozzle (single or double) and, eventually, by a perforated diaphragm placed opposite from the nozzle, so as to reinforce the recirculation of the reactants in this direct reaction zone.

The process may therefore provide some of the following benefits:

the transformation of hydrocarbons into products of added value ($H_2$, CO, unsaturated hydrocarbons), the only reactant required is water and/or $O_2$, the absence of any conventional catalyst, the very compact equipment which may be installed in restricted areas (for example, on offshore petroleum platforms for the conversion of associated gases), the method does not depend on the chemical composition of the hydrocarbon mixture to be converted, the gliding discharges have no thermal inertia, therefore they respond immediately to the control signals, with the exception of the use of atmospheric or enriched air and the conversion of NGs initially rich in $CO_2$, the resulting products, after the condensation of water vapor, contain very little $CO_2$ and no other foreign ballast that may increase their volume, which makes the conversion and/or recycling operations easier.

While the present invention has been described with reference to particular embodiments, it will be understood that the embodiments are illustrated and that the invention scope is not so limited. Any variations, modifications, additions and improvements to the embodiments described are possible. These variations, modifications, additions and improvements may fall within the scope of the invention as detailed within the following claims.

What is claimed is:

1. A process for the conversion of hydrocarbons comprising:
   mixing said hydrocarbons with oxygen; and
   exposing said hydrocarbons and oxygen to a gliding electric discharge plasma in order to generate and maintain chemical reactions which convert said hydrocarbons and oxygen into synthesis gas, said synthesis gas comprising a mixture of hydrogen and carbon monoxide.

2. The process of claim 1 wherein said chemical reactions comprise oxidation of said hydrocarbons and wherein said hydrocarbons are light hydrocarbons.

3. The process of claim 2 wherein said synthesis gas further comprises unsaturated hydrocarbons.

4. The process of claim 3 wherein said hydrocarbons and oxygen are mixed with a volume ratio of at least 0.22 oxygen/hydrocarbons.

5. The process of claim 4 wherein said hydrocarbons and oxygen are of natural origin.

6. The process of claim 4 wherein said hydrocarbons and oxygen are derived from an industrial activity.

7. The process of claim 4 wherein said hydrocarbons and oxygen are mixed in a reactor by the separate introduction of preheated gases.

8. The process of claim 1, wherein said mixing further comprises mixing said hydrocarbons and oxygen with water vapor, and wherein said exposing said hydrocarbons and oxygen to a gliding electric discharge plasma comprises exposing said hydrocarbons, oxygen, and water vapor to a gliding electric discharge plasma in order to generate and maintain chemical reactions which convert at least some of said hydrocarbons, oxygen and water vapor into a synthesis gas, and further comprising:
   bringing said synthesis gas containing an unconverted portion of said hydrocarbons, oxygen, and water vapor to a temperature not exceeding 1100° C.; and
   placing said hydrocarbons, oxygen, water vapor and said synthesis gas in contact with a solid material to promote conversion of said unconverted portion of said hydrocarbons, oxygen and water vapor into said synthesis gas.

9. The process of claim 8 wherein said solid material comprises a metal.

10. The process of claim 8 wherein said solid material comprises a ceramic.

11. The process of claim 8 wherein said conversion of said first portion of said hydrocarbons, oxygen and water vapor into said synthesis gas is performed at a pressure between 7 kPa and 6 bars and at a temperature less than 1200° C.

12. The process of claim 11 wherein said synthesis gas contains hydrogen and carbon monoxide in a volume ratio of between 0.46 and 3.05.

13. The process of claim 11 wherein no more than 0.5% of the mass of carbon in said hydrocarbons is converted into soots, no more than 0.5% of the mass of carbon in said hydrocarbons is converted into cokes, and no more than 0.5% of the mass of carbon in said hydrocarbons is converted into tars.

14. The process of claim 1, wherein said mixing comprises mixing the hydrocarbons and oxygen in gaseous form.

15. A hydrocarbon conversion process, comprising:
   providing a gliding arc reactor comprising a plasma compartment and a post-plasma compartment;
   introducing a mixture comprising hydrocarbons and an oxidizing gas into the gliding arc reactor, wherein the oxidizing gas comprises oxygen;
   exposing the mixture to a gliding electric arc within the plasma compartment for converting the mixture into synthesis gas, the synthesis gas comprising hydrogen H2 and carbon monoxide CO; and
   transporting the mixture from the plasma compartment into the post-plasma compartment.

16. The process of claim 15, wherein said introducing a mixture into the gliding arc reactor comprises introducing the mixture in gaseous form into the gliding arc reactor.

17. The process of claim 16, wherein said introducing the mixture in gaseous form to the gliding arc reactor comprises mixing a hydrocarbon gas and the oxidizing gas within the gliding arc reactor prior to said exposing.

18. The process of claim 16, further comprising preheating the mixture prior to said introducing the mixture in gaseous form to the gliding arc reactor.

19. The process of claim 15, wherein the oxidizing gas further comprises oxygen gas.

20. The process of claim 19, wherein the oxidizing gas further comprises water vapor.

21. The process of claim 15, wherein the plasma compartment comprises a plurality of gliding arc electrodes, and wherein the plasma compartment and the post-plasma compartment are divided by a member, and wherein said transporting a mixture from the plasma compartment into the post-plasma compartment comprises transporting the mixture through the member.

22. The process of claim 21, wherein the member is a perforated plate, and wherein the perforated plate serves to reinforce recirculation of the mixture within the plasma compartment during said exposing.

23. The process of claim 21, wherein the ratio of energy supplied to the plurality of gliding arc electrodes to the flow rate of the mixture during said exposing is 0.10 to 0.34 $kWh/m^3$.

24. The process of claim 21, wherein the reactor comprises a solid material in the post-plasma compartment, and further comprising contacting the solid material with the mixture for promoting conversion of an unconverted portion of the mixture into said synthesis gas.

25. The process of claim 21, further comprising maintaining the solid material at a temperature of at most 1100° C. during said contacting for enhancing the conversion of an unconverted portion of the mixture into the synthesis gas.

26. The process of claim 15, wherein the mixture comprises a plurality of hydrocarbon molecules comprising a plurality of molecular weights, and wherein the conversion of the plurality of hydrocarbon molecules into synthesis gas from said exposing increases with increasing molecular weight of the hydrocarbon molecules.

* * * * *